United States Patent
Siegmund et al.

(10) Patent No.: US 6,181,789 B1
(45) Date of Patent: Jan. 30, 2001

(54) TELECOMMUNICATION SYSTEM AND PROCESSOR MEANS, AND METHOD

(75) Inventors: Gerd Siegmund, Stuttgart; Heike Felbecker-Janho, Korntal-Münchingen, both of (DE)

(73) Assignee: Alcatel, Paris (FR)

( * ) Notice: Under 35 U.S.C. 154(b), the term of this patent shall be extended for 0 days.

(21) Appl. No.: 09/067,581

(22) Filed: Apr. 28, 1998

(30) Foreign Application Priority Data

Apr. 30, 1997 (EP) ................................................. 97 440 042

(51) Int. Cl.[7] ........................................................... H04M 7/00
(52) U.S. Cl. ............................. 379/230; 379/201; 379/207
(58) Field of Search ..................................... 379/201, 207, 379/211, 229, 230, 219, 220

(56) References Cited

U.S. PATENT DOCUMENTS

| | | | |
|---|---|---|---|
| 5,345,502 | 9/1994 | Rothenhöfer | 379/207 |
| 5,422,940 | 6/1995 | Endo et al. | 379/207 |
| 5,490,212 * | 2/1996 | Lautenschlager | 379/201 X |
| 5,517,564 * | 5/1996 | Slater et al. | 379/201 X |
| 5,818,921 * | 10/1998 | Vanden Meiden et al. | 379/225 |
| 5,917,879 * | 6/1999 | Moss et al. | 379/207 X |
| 6,075,852 * | 6/2000 | Ashworth et al. | 379/201 |

OTHER PUBLICATIONS

"Virtual Networks: Past, Present and Future", J. Brosemer et al, *IEEE Communications Magazine*, vol. 30, No. 3, Mar. 1992, pp. 80–85.

"Business Communication in AXE", A. Raushagen et al, *Ericsson Review*, No. B, 1987, pp. 11–19.

* cited by examiner

Primary Examiner—Creighton Smith

(57) ABSTRACT

In known telecommunication systems a combination of a switch like a Service Switching Point or SSP and processor means like a Service Control Point or SCP can be used for providing several virtual private networks, which are completely independent. By allowing at least one destination of a virtual private number of one of said virtual private networks to correspond with a destination of a virtual private number of another virtual private network, the number of user possibilities is increased, like for example two companies each one of them having its own virtual private network and both having the possibility to work with the same secretary who works at home or with for example a secretary company situated at another location.

Figure 1:
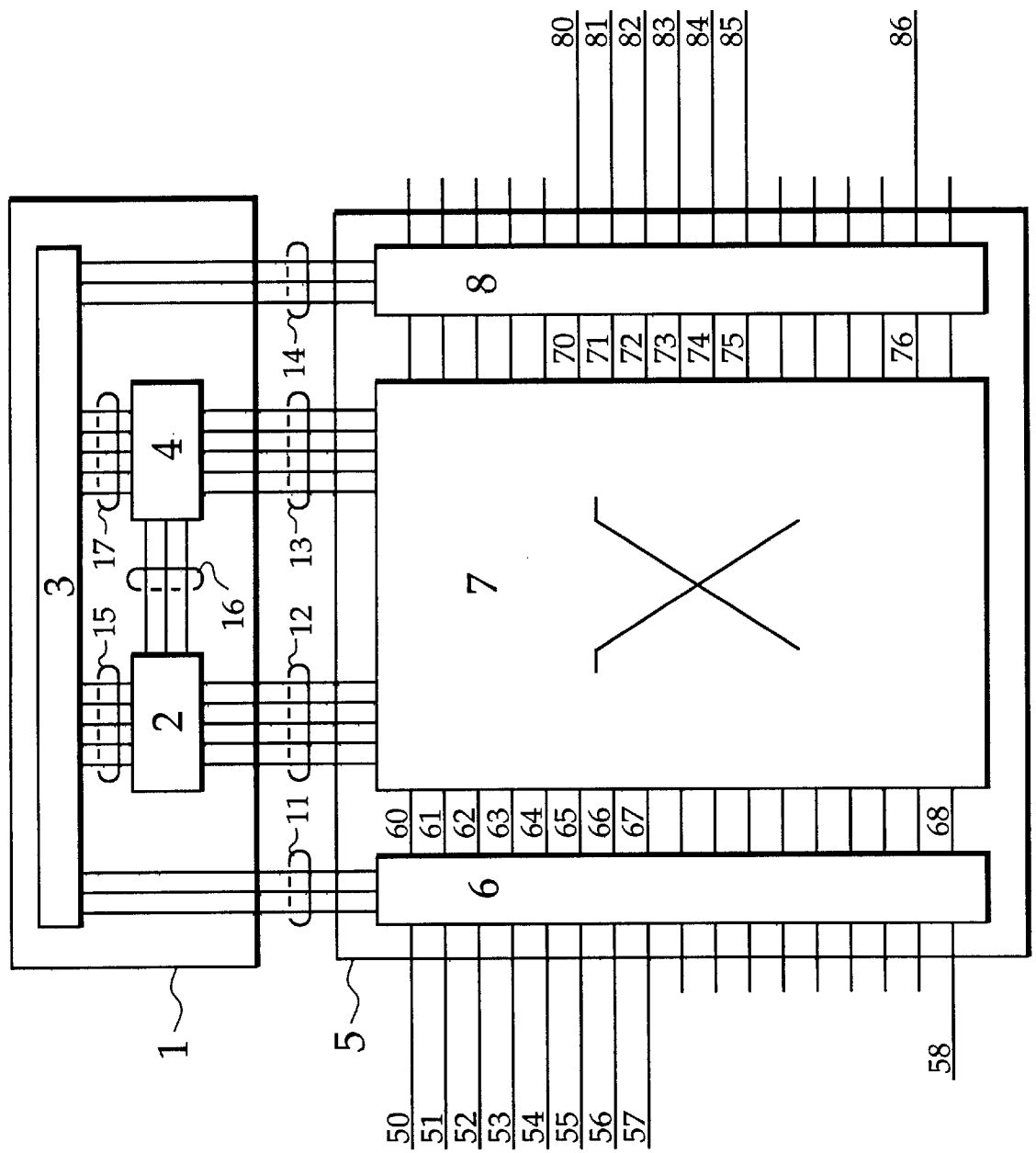

10 Claims, 1 Drawing Sheet

TELECOMMUNICATION SYSTEM AND PROCESSOR MEANS, AND METHOD

A. BACKGROUND OF THE INVENTION

1. Technical Field

The invention relates to a telecommunication system for providing virtual private networks and comprising processor means for controlling a switch for making connections between origins and destinations, which processor means in response to a first virtual private number belonging to a first virtual private network, controls said switch for coupling a first origin to a first destination, and in response to a further first virtual private number belonging to said first virtual private network, controls said switch for coupling said first origin to a further first destination, in response to a second virtual private number belonging to a second virtual private network, controls said switch for coupling a second origin to a second destination, and in response to a further second virtual private number belonging to said second virtual private network, controls said switch for coupling said second origin to a further second destination.

2. Discussion of Related Art

Such a telecommunication system is of common general knowledge and comprises for example a Service Switching Point or SSP functioning as said switch and comprises for example a Service Control Point or SCP functioning as said processor means. In response to a first virtual private number like for example XY1 belonging to a first virtual private network XY, said switch couples a first origin OR-1 to a first destination DE-XY1, and in response to a further first virtual private number XY2 belonging to said first virtual private network XY, said switch couples said first origin OR-1 to a further first destination DE-XY2. In response to a second virtual private number UW1 belonging to a second virtual private network UW, said switch couples a second origin OR-2 to a second destination DE-UW1, and in response to a further second virtual private number UW2 belonging to said second virtual private network UW, said switch couples said second origin OR-2 to a further second destination DE-UW2. So, a combination of said SSP and SCP is used to provide two or more virtual private networks, which are completely independent. Said SSP is further used, of course, for switching ordinary telephone calls, whereby in response to an ordinary telephone number ABCDEFGH a certain origin is coupled to a certain destination.

Said known telecommunication system is disadvantageous because of offering only a few user possibilities.

B. SUMMARY OF THE INVENTION

It is an object of the invention, inter alia, to provide a telecommunication system as described above in the technical field section which offers more user possibilities.

Thereto, the telecommunication system according to the invention is characterised in that the first destination and the second destination are the same, and that the further first destination and the further second destination are different.

By allowing at least one destination defined by said first virtual private number belonging to said first virtual private network and originating from said first origin and at least one destination defined by said second virtual private number belonging to said second virtual private network and originating from said second origin to be the same, the possibility has been created of reaching the same destination from different virtual private networks, each one of them operating via said combination of processor means and switch, by using said virtual private numbers, which will usually be different per virtual private network, but which could also be the same.

The invention solves the problem of increasing the number of user possibilities in a known telecommunication system by providing said processor means with software allowing said destinations to be the same. At least a part of the inventivity of this solution is situated in overcoming the prejudice that two or more virtual private networks operating via a combination of processor means and switch should remain completely separated.

From U.S. Pat. No. 5,345,502 it is known to couple different virtual private networks in a very advantageous way, each one of said different virtual private networks having its own processor and its own switch. This granted patent of the assignee hereof does not disclose an increase in the number of user possibilities for different virtual private networks, each one of them operating via said combination of processor means and switch. In view of this it should be observed that according to the invention said processor means could comprise several processors and that said switch could comprise several switches. But contrary to U.S. Pat. No. 5,345,502, the virtual private networks according to the invention do not have their own processor and their own switch.

At said same destination, for example the home location of a secretary working for different companies, which location can be reached from different virtual private networks, each one of them belonging to one of said companies, preferably the possibility exists of calling each one of said companies by also using virtual private numbers instead of ordinay telephone numbers.

A first embodiment of the telecommunication system according to the invention is characterised in that in response to said further second virtual private number originating from said first origin there is no coupling of said first origin to said further second destination and in response to said further first virtual private number originating from said second origin there is no coupling of said second origin to said further first destination.

When using said further second virtual private number inside said first virtual private network, and when using said further first virtual private number inside said second virtual private network, the destinations as expected (when using said further second virtual private number inside said second virtual private network, and when using said further first virtual private number inside said first virtual private network) will in general not be reached.

A second embodiment of the telecommunication system according to the invention is characterised in that said telecommunication system comprises a first input connectable to said first origin for receiving said first virtual private number belonging to said first virtual private network, in response to which said switch couples said first input to a first output connectable to said first destination, and for receiving said further first virtual private number belonging to said first virtual private network, in response to which said switch couples said first input to a further first output connectable to said further first destination, and a second input connectable to said second origin for receiving said second virtual private number belonging to said second virtual private network, in response to which said switch couples said second input to a second output connectable to said second destination, and for receiving said further second virtual private number belonging to said second virtual private network, in response to which said switch couples said second input to a further second output connectable to said further second destination.

A third embodiment of the telecommunication system according to the invention is characterised in that said processor means comprise

- detection means coupled to said first input and to said second input for detecting said first virtual private number and said further first virtual private number and said second virtual private number and said further second virtual private number, and
- generation means coupled to said detection means and to said switch for generating, in response to a detection of said first virtual private number originating from said first input, a first control signal destined for said switch, and in response to a detection of said further first virtual private number originating from said first input, a further first control signal destined for said switch, and in response to a detection of said second virtual private number originating from said second input, a second control signal destined for said switch, and in response to a detection of said further second virtual private number originating from said second input, a further second control signal destined for said switch, and in response to a detection of said further first virtual private number originating from said second input, a third control signal destined for said switch, and in response to a detection of said further second virtual private number originating from said first input, a fourth control signal destined for said switch, with said first control signal and said second control signal defining the same destination, and with said further first control signal and said further second control signal and said third control signal and said fourth control signal being mutually different.

The invention further relates to processor means for controlling a switch for making connections between origins and destinations for providing virtual private networks in a telecommunication system as described above, which processor means

- in response to a first virtual private number belonging to a first virtual private network, controlls said switch for coupling a first origin to a first destination, and
- in response to a further first virtual private number belonging to said first virtual private network, controlls said switch for coupling said first origin to a further first destination,
- in response to a second virtual private number belonging to a second virtual private network, controlls said switch for coupling a second origin to a second destination, and
- in response to a further second virtual private number belonging to said second virtual private network, controlls said switch for coupling said second origin to a further second destination.

It is a further object of the invention, inter alia, to provide processor means as described above which offer more user possibilities.

Thereto, the processor means according to the invention are characterised in that the first destination and the second destination are the same, and that the further first destination and the further second destination are different.

A first embodiment of the processor means according to the invention is characterised in that in response to said further second virtual private number originating from said first origin there is no coupling of said first origin to said further second destination and in response to said further first virtual private number originating from said second origin there is no coupling of said second origin to said further first destination.

A second embodiment of the processor means according to the invention is characterised in that said switch comprises

- a first input connectable to said first origin for receiving said first virtual private number belonging to said first virtual private network, in response to which said switch couples said first input to a first output connectable to said first destination, and for receiving said further first virtual private number belonging to said first virtual private network, in response to which said switch couples said first input to a further first output connectable to said further first destination, and
- a second input connectable to said second origin for receiving said second virtual private number belonging to said second virtual private network, in response to which said switch couples said second input to a second output connectable to said second destination, and for receiving said further second virtual private number belonging to said second virtual private network, in response to which said switch couples said second input to a further second output connectable to said further second destination.

A third embodiment of the processor means according to the invention is characterised in that said processor means comprise

- detection means coupled to said first input and to said second input for detecting said first virtual private number and said further first virtual private number and said second virtual private number and said further second virtual private number, and
- generation means coupled to said detection means and to said switch for generating, in response to a detection of said first virtual private number originating from said first input, a first control signal destined for said switch, and in response to a detection of said further first virtual private number originating from said first input, a further first control signal destined for said switch, and in response to a detection of said second virtual private number originating from said second input, a second control signal destined for said switch, and in response to a detection of said further second virtual private number originating from said second input, a further second control signal destined for said switch, and in response to a detection of said further first virtual private number originating from said second input, a third control signal destined for said switch, and in response to a detection of said further second virtual private number originating from said first input, a fourth control signal destined for said switch, with said first control signal and said second control signal defining the same destination, and with said further first control signal and said further second control signal and said third control signal and said fourth control signal being mutually different.

The invention yet further relates to a method for making connections between origins and destinations via a switch in a telecommunication system for providing virtual private networks and comprising said switch, which method comprises the steps of in response to a first virtual private number belonging to a first virtual private network, controlling said switch for coupling a first origin to a first destination, and in response to a further first virtual private number belonging to said first virtual private network, controlling said switch for coupling said first origin to a further first destination, in response to a second virtual private number belonging to a second virtual private network, controlling said switch for coupling a second origin to a second destination, and in response to a further second virtual private number belonging to said second virtual private network, controlling said switch for coupling said second origin to a further second destination.

The method according to the invention is characterised in that the first destination and the second destination are the same, and that the further first destination and the further second destination are different.

A first embodiment of the method according to the invention is characterised in that in response to said further second virtual private number originating from said first origin there is no coupling of said first origin to said further second destination and in response to said further first virtual private number originating from said second origin there is no coupling of said second origin to said further first destination.

C. REFERENCES

U.S. Pat. No. 5,345,502

All references including further references cited with respect to and/or inside said references are considered to be incorporated in this patent application.

D. BRIEF DESCRIPTION OF THE DRAWING

The invention will be explained in greater detail at the hand of an embodiment disclosed in the sole FIGURE, whereby an embodiment of the telecommunication system is shown according to the invention comprising processor means according to the invention and a switch.

E. DETAILED DESCRIPTION OF PREFERRED EMBODIMENTS

The telecommunication system according to the invention as disclosed in the sole FIGURE comprises processor means 1 according to the invention and a switch 5. Said processor means 1 are provided with a processor 2, detection means 3 and generation means 4. Processor 2 is coupled via control connections 15 to detection means 3 and is coupled via control connections 16 to generation means 4 and is coupled via control connections 12 to switch 5. Detection means 3 are coupled via control connections 17 to generation means 4 and are coupled via control connections 11 and 14 to switch 5. Generation means 4 are coupled via control connections 13 to switch 5. Switch 5 comprises a first detector 6, a coupler 7 and a second detector 8. Said first detector 6 comprises at its left side several in/outputs, of which the first eight in/outputs are numbered in the FIGURE with reference numerals 50–57 and of which the last in/output is numbered 58, and comprises at its right side several in/outputs coupled to coupler 7, of which the first eight in/outputs are numbered 60–67 and of which the last in/output is numbered 68, and comprises control in/outputs coupled to control connections 11. Said second detector 8 comprises at its left side several in/outputs coupled to coupler 7 of which the sixth to eleventh in/outputs are numbered 70–75 and of which the lost but one in/output is numbered 76, and comprises at its right side several in/outputs, of which the sixth to eleventh in/outputs are numbered 80–85 and of which the last but one in/output is numbered 86, and comprises control in/outputs coupled to control connections 14. Coupler 7 further comprises control in/outputs coupled to control connections 12 and to control connections 13.

The telecommunication system as disclosed in FIG. 1 offers the following possibilities. In/outputs 50–57 are for example coupled to telephones of a first company having a first virtual private network XY. In/outputs 80–85 are for example coupled to telephones of a second company having a second virtual private network UW. In/output 58 is for example coupled to a telephone of a third company not having a virtual private network and in/output 86 is for example coupled to a telephone of a secretary who works at home or to a telephone of a secretary company. A first employee working for said first company and for example using the telephone connected to in/output 50 (in this case a first origin OR-1) dials for example a first virtual private number XY8 to call the secretary having the telephone connected to in/output 86 (in this case a first destination DE-XY8) and dials for example a further first virtual private number XY5 to call his colleague having the telephone connected to in/output 55 (in this case a further first destination DE-XY5) and dials for example an ordinary number ABCDEFGH to call the third company having the telephone connected to in/output 58 (in this case an other destination DE-ABCDEFGH). A second employee working for said second company and for example using the telephone connected to in/output 80 (in this case a second origin OR-2) dials for example a second virtual private number UW9 to call the secretary having the telephone connected to in/output 86 (in this case a second destination DE-UW9) and dials for example a further second virtual private number UW3 to call his colleague having the telephone connected to in/output 83 (in this case a further second destination DE-UW3) and dials for example the ordinary number ABCDEFGH to call the third company having the telephone connected to in/output 58 (in this case an other destination DE-ABCDEFGH). These possibilities are realised as follows.

When said first employee uses the telephone connected to in/output 50 (said first origin OR-1) and dials the number XY8, this number XY8 arrives at first detector 6, which recognises said number XY8 as a virtual private number belonging to the virtual private network XY, and sends said number XY8 to processor means 1 via control connections 11. In processor means 1 detector means 3 detect said number XY8, and inform processor 2 via control connections 15 about said detection, and supply at least a part of said number XY8 via control connections 17 to generator means 4, which, in response to command signals originating from processor 2 via control connections 16, generate a first control signal to be supplied to coupler 7 via control connections 13. In response to command signals originating from processor 2 via control connections 12 and said first control signal, coupler 7 couples in/output 60 to in/output 76, as a consequence of which in/output 50 is connected with in/output 86. In this manner, said first employee at said first origin OR-1 working for said first company having said first virtual private network XY can communicate with said secretary at said first destination DE-XY8 by dialling said first virtual private number XY8.

When said first employee uses the telephone connected to in/output 50 (said first origin OR-1) and dials the number XY5, this number XY5 arrives at first detector 6, which recognises said number XY5 as a virtual private number belonging to the virtual private network XY, and sends said number XY5 to processor means 1 via control connections 11. In processor means 1 detector means 3 detect said number XY5, and inform processor 2 via control connections 15 about said detection, and supply at least a part of said number XY5 via control connections 17 to generator means 4, which, in response to command signals originating from processor 2 via control connections 16, generate a further first control signal to be supplied to coupler 7 via control connections 13. In response to command signals originating from processor 2 via control connections 12 and said further first control signal, coupler 7 couples in/output 60 to in/output 65, as a consequence of which in/output 50 is connected with in/output 55. In this manner, said first employee at said first origin OR-1 working for said first company having said first virtual private network XY can communicate with his colleague at said further first destination DE-XY5 by dialling said further first virtual private number XY5.

When said first employee uses the telephone connected to in/output 50 (said first origin OR-1) and dials the number ABCDEFGH, this number ABCDEFGH arrives at first detector 6, which recognises said number ABCDEFGH as an ordinary number, in response to which coupler 7 couples in/output 60 to in/output 68 (with the use of processor means 1 or without using processor means 1), as a consequence of which in/output 50 is connected with in/output 58. In this manner, said first employee at said first origin OR-1 working for said first company having said first virtual private network XY can communicate with said third company at said other destination DE-ABCDEFGH by dialling said ordinary number ABCDEFGH.

When said second employee uses the telephone connected to in/output 80 (said second origin OR-2) and dials the number UW9, this number UW9 arrives at second detector 8, which recognises said number UW9 as a virtual private number belonging to the virtual private network UW, and sends said number UW9 to processor means 1 via control connections 11. In processor means 1 detector means 3 detect said number UW9, and inform processor 2 via control connections 15 about said detection, and supply at least a part of said number UW9 via control connections 17 to generator means 4, which, in response to command signals originating from processor 2 via control connections 16, generate a second control signal to be supplied to coupler 7 via control connections 13. In response to command signals originating from processor 2 via control connections 12 and said second control signal, coupler 7 couples in/output 70 to in/output 76, as a consequence of which in/output 80 is connected with in/output 86. In this manner, said second employee at said second origin OR-2 working for said second company having said second virtual private network UW can communicate with said secretary at said second destination DE-UW9 by dialling said second virtual private number UW9.

When said second employee uses the telephone connected to in/output 80 (said second origin OR-2) and dials the number UW3, this number UW3 arrives at second detector 8, which recognises said number UW3 as a virtual private number belonging to the virtual private network UW, and sends said number UW3 to processor means 1 via control connections 11. In processor means 1 detector means 3 detect said number UW3, and inform processor 2 via control connections 15 about said detection, and supply at least a part of said number UW3 via control connections 17 to generator means 4, which, in response to command signals originating from processor 2 via control connections 16, generate a further second control signal to be supplied to coupler 7 via control connections 13. In response to command signals originating from processor 2 via control connections 12 and said further second control signal, coupler 7 couples in/output 70 to in/output 73, as a consequence of which in/output 80 is connected with in/output 83. In this manner, said second employee at said second origin OR-2 working for said second company having said second virtual private network UW can communicate with his colleague at said further second destination DE-UW3 by dialling said further second virtual private number UW3.

When said second employee uses the telephone connected to in/output 80 (said second origin OR-2) and dials the number ABCDEFGH, this number ABCDEFGH arrives at second detector 8, which recognises said number ABCDEFGH as an ordinary number, in response to which coupler 7 couples in/output 70 to in/output 68 (with the use of processor means 1 or without using processor means 1), as a consequence of which in/output 80 is connected with in/output 58. In this manner, said second employee at said second origin OR-2 working for said second company having said second virtual private network UW can communicate with said third company at said other destination DE-ABCDEFGH by dialling said ordinary number ABCDEFGH.

Summarising, with the telecommunication system according to the invention as disclosed in FIG. 1 comprising the processor means 1 according to the invention more user possibilities are offered due to the fact that the first destination DE-XY8 and the second destination DE-UW9 are the same (both destinations being the telephone coupled to in/output 86), with the further first destination DE-XY5 and the further second destination DE-UW3 being different. By allowing at least one destination DE-XY8 defined by said first virtual private number XY-8 belonging to said first virtual private network XY and originating from said first origin OR-1 and at least one destination DE-UW9 defined by said second virtual private number UW9 belonging to said second virtual private network UW and originating from said second origin OR-2 to be the same, the possibility has been created of reaching the same destination from different virtual private networks, each one of them operating via said combination of processor means 1 and switch 5, by using said virtual private numbers XY-8 and UW-9, which will usually be different per virtual private network, but which could also be the same. The invention solves the problem of increasing the number of user possibilities in a known telecommunication system by providing said processor means 1 with software allowing said destinations DE-XY8 and DE-UW9 to be the same. At least a part of the inventivity of this solution is situated in overcoming the prejudice that two or more virtual private networks XY and UW operating via a combination of processor means 1 and switch 5 should remain completely separated.

At said same destination DE-XY8 or DE-UW9, for example the home location of a secretary working for different companies, which location can be reached from different virtual private networks XY and UW, each one of them belonging to one of said companies, preferably the possibility exists of calling each one of said companies by also using virtual private numbers instead of ordinay telephone numbers. In other words, said secretary should preferably use the telephone connected to in/output 86 and dial for example the respective virtual private numbers XY-1 and UW-2 for being connected to the respective in/outputs 51 and 81 in a way as described above, instead of having to dial ordinary telephone numbers.

Of course, when said first employee dials said further second virtual private number UW3 inside said first virtual private network XY, and when said second employee dials said further first virtual private number XY5 inside said second virtual private network UW, the destinations as expected (DE-UW3 when using said further second virtual private number UW3 inside said second virtual private network UW, and DE-XY5 when using said further first virtual private number XY5 inside said first virtual private network XY) will in general not be reached.

According to a further embodiment of the telecommunication system according to the invention, said telecommunication system comprises

- a first input (50) connectable to said first origin OR-1 for receiving said first virtual private number XY-8 belonging to said first virtual private network XY, in response to which said switch 5 couples said first input (50) to a first output (86) connectable to said first destination DE-XY8, and for receiving said further first virtual private number XY-5 belonging to said first virtual private network XY, in response to which said switch 5 couples said first input (50) to a further first output (55) connectable to said further first destination DE-XY5, and
- a second input (80) connectable to said second origin OR-2 for receiving said second virtual private number UW-9 belonging to said second virtual private network UW, in response to which said switch 5 couples said second input (80) to a second output (86) connectable to said second destination DE-UW9, and for receiving said further second virtual private number UW-3 belonging to said second virtual private network UW, in response to which said switch 5 couples said second input (80) to a further second output (83) connectable to said further second destination DE-UW3.

According to a yet further embodiment of the telecommunication system according to the invention, said processor means 1 comprise

- detection means 3 coupled to said first input (50) and to said second input (80) for detecting said first virtual private number XY-8 and said further first virtual private number XY-5 and said second virtual private number UW-9 and said further second virtual private number UW-3, and
- generation means 4 coupled to said detection means 3 and to said switch 5 for generating, in response to a detection of said first virtual private number XY-8 originating from said first input (50), a first control signal destined for said switch 5, and in response to a detection of said further first virtual private number XY-5 originating from said first input (50), a further first control signal destined for said switch 5, and in response to a detection of said second virtual private number UW-9 originating from said second input (80), a second control signal destined for said switch 5, and in response to a detection of said further second virtual private number UW-3 originating from said second input (80), a further second control signal destined for said switch 5, and in response to a detection of said further first virtual private number XY-5 originating from said second input (80), a third control signal destined for said switch 5, and in response to a detection of said further second virtual private number UW-3 originating from said first input (50), a fourth control signal destined for said switch 5, with said first control signal and said second control signal defining the same destination DE-XY8=DE-UW9, and with said further first control signal and said further second control signal and said third control signal and said fourth control signal being mutually different (due to the fact that said further first control signal defines destination DE-XY5 and that said further second control signal defines a different destination DE-UW3 and that said third control signal and said fourth control in general either do not define a destination or define further different destinations).

The term input does not exclude the possibility of also being an output, and the term output does not exclude the possibility of also being an input. The term in/output should be read as input and/or output. Said invention should not be restricted to fixed networks but could also be used for mobile networks, and does further not exclude the presence of further exchanges between at least two of the features origin, switch 5, processing means 1 and destination.

The content of processing means 1 and of switch 5 is just an exemplary embodiment which could be altered in many ways without leaving the scope of the invention. For example, processor 2 could be integrated with detection means 3, or with generation means 4, or a part of processor 2 could be integrated with detection means 3 and an other part of processor 2 could be integrated with generation means 4. Further, coupler 7 could be fully controlled by either processor 2 only or by generation means 4 only, and/or could also be controlled by detection means 3. The content of switch 5 is of common general knowledge to a person skilled in the art, as well as the functioning of first detector 6 and of second detector 8 with respect to dealing with virtual private numbers and ordinary numbers. For example the detection of virtual private numbers could be realised by automatically adding a code to a virtual private number at the origin or between origin and switch, which code could be detected, and/or by detecting a virtual private number having a certain exclusive characteristic, which characteristic could be detected, and/or by detecting a virtual private number in combination with the in/output at which it arrives, etc. Of course, at least a part of processor means 1 and at least a part of switch 5 could be integrated, without leaving the scope of the invention.

When both employees of both different companies at the same time try to contact said secretary, only one of them will succeed, unless said secretary has got two or more lines and devices coupled to said switch, and/or said secretary has got the possibility of switching between calls and/or of answering second calls. In case ISDN is used, further possibilities known to a person skilled in the art are present. The invention further does not exclude the use of all possible speech and/or data equipment, and does not exclude the use of all possible video equipment, because of said invention in general dealing with the partial overlap of virtual private networks to be provided via one combination of processing means and switching means, with said processing means possibly comprising several processors and with said switching means possibly comprising several switches.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Telecommunication system for providing virtual private networks and comprising a switch and processor means for controlling said switch for making connections between origins and destinations, which processor means comprises:

means responsive to a first virtual private number belonging to a first virtual private network, for controlling said switch for coupling a first origin to a first destination, and means responsive to a further first virtual private number belonging to said first virtual private network, for controlling said switch for coupling said first origin to a further first destination, means responsive to a second virtual private number belonging to a second virtual private network, for controlling said switch for coupling a second origin to a second destination, and means responsive to a further second virtual private number belonging to said second virtual private network, for controlling said switch for coupling said second origin to a further second destination, characterised in that the first destination and the second destination are the same, and that the further first destination and the further second destination are different.

2. Telecommunication system as claimed in claim 1, characterised in that in response to said further second virtual private number originating from said first origin there is no coupling of said first origin to said further second destination and in response to said further first virtual private number originating from said second origin there is no coupling of said second origin to said further first destination.

3. Telecommunication system as claimed in claim 1, characterised in that said telecommunication system includes:

a first input connectable to said first origin for receiving said first virtual private number belonging to said first virtual private network, in response to which said switch couples said first input to a first output connectable to said first destination, and for receiving said further first virtual private number belonging to said first virtual private network, in response to which said switch couples said first input to a further first output connectable to said further first destination, and a second input connectable to said second origin for receiving said second virtual private number belonging to said second virtual private network, in response to which said switch couples said second input to a second output connectable to said second destination, and for receiving said further second virtual private number belonging to said second virtual private network, in response to which said switch couples said second input to a further second output connectable to said further second destination.

4. Telecommunication system as claimed in claim 3, characterised in that said processor means includes:

detection means coupled to said first input and to said second input for detecting said first virtual private number and said further first virtual private number and said second virtual private number and said further second virtual private number, and generation means coupled to said detection means and to said switch for generating, in response to a detection of said first virtual private number originating from said first input, a first control signal destined for said switch, and in response to a detection of said further first virtual private number originating from said first input, a further first control signal destined for said switch, and in response to a detection of said second virtual private number originating from said second input, a second control signal destined for said switch, and in response to a detection of said further second virtual private number originating from said second input, a further second control signal destined for said switch, and in response to a detection of said further first virtual private number originating from said second input, a third control signal destined for said switch, and in response to a detection of said further second virtual private number originating from said first input, a fourth control signal destined for said switch, with said first control signal and said second control signal defining the same destination, and with said further first control signal and said further second control signal and said third control signal and said fourth control signal being mutually different.

5. Processor means for controlling a switch for making connections between origins and destinations for providing virtual private networks in a telecommunication system which processor means comprises:

means responsive to a first virtual private number belonging to a first virtual private network, for controlling said switch for coupling a first origin to a first destination, and means responsive to a further first virtual private number belonging to said first virtual private network, for controlling said switch for coupling said first origin to a further first destination, means responsive to a second virtual private number belonging to a second virtual private network, for controlling said switch for coupling a second origin to a second destination, and means responsive to a further second virtual private number belonging to said second virtual private network, for controlling said switch for coupling said second origin to a further second destination, characterised in that the first destination and the second destination are the same, and that the further first destination and the further second destination are different.

6. Processor means as claimed in claim 5, characterised in that in response to said further second virtual private number originating from said first origin there is no coupling of said first origin to said further second destination and in response to said further first virtual private number originating from said second origin there is no coupling of said second origin to said further first destination.

7. Processor means as claimed in claim 5, characterised in that said switch comprises a first input connectable to said first origin for receiving said first virtual private number belonging to said first virtual private network, in response to which said switch couples said first input to a first output connectable to said first destination, and for receiving said further first virtual private number belonging to said first virtual private network, in response to which said switch couples said first input to a further first output connectable to said further first destination, and a second input connectable to said second origin for receiving said second virtual private number belonging to said second virtual private network, in response to which said switch couples said second input to a second output connectable to said second destination, and for receiving said further second virtual private number belonging to said second virtual private network, in response to which said switch couples said second input to a further second output connectable to said further second destination.

8. Processor means as claimed in claim 7, characterised in that said processor means comprise
- detection means coupled to said first input and to said second input for detecting said first virtual private number and said further first virtual private number and said second virtual private number and said further second virtual private number, and
- generation means coupled to said detection means and to said switch for generating, in response to a detection of said first virtual private number originating from said first input, a first control signal destined for said switch, and in response to a detection of said further first virtual private number originating from said first input, a further first control signal destined for said switch, and in response to a detection of said second virtual private number originating from said second input, a second control signal destined for said switch, and in response to a detection of said further second virtual private number originating from said second input, a further second control signal destined for said switch, and in response to a detection of said further first virtual private number originating from said second input, a third control signal destined for said switch, and in response to a detection of said further second virtual private number originating from said first input, a fourth control signal destined for said switch, with said first control signal and said second control signal defining the same destination, and with said further first control signal and said further second control signal and said third control signal and said fourth control signal being mutually different.

9. Method for making connections between origins and destinations via a switch in a telecommunication system for providing virtual private networks and comprising said switch, which method comprises the steps of
- in response to a first virtual private number belonging to a first virtual private network, controlling said switch for coupling a first origin to a first destination, and
- in response to a further first virtual private number belonging to said first virtual private network, controlling said switch for coupling said first origin to a further first destination,
- in response to a second virtual private number belonging to a second virtual private network, controlling said switch for coupling a second origin to a second destination, and
- in response to a further second virtual private number belonging to said second virtual private network, controlling said switch for coupling said second origin to a further second destination, characterised in that the first destination and the second destination are the same, and that the further first destination and the further second destination are different.

10. Method as claimed in claim 9, characterised in that in response to said further second virtual private number originating from said first origin there is no coupling of said first origin to said further second destination and in response to said further first virtual private number originating from said second origin there is no coupling of said second origin to said further first destination.

* * * * *